United States Patent [19]

Gormish et al.

[11] Patent Number: 5,689,589
[45] Date of Patent: Nov. 18, 1997

[54] DATA COMPRESSION FOR PALETTIZED VIDEO IMAGES

[75] Inventors: Michael J. Gormish, Los Altos; Martin P. Boliek, San Francisco, both of Calif.

[73] Assignees: Ricoh Company Ltd., Tokyo, Japan; Ricoh Corporation, Menlo Park, Calif.

[21] Appl. No.: 347,789

[22] Filed: Dec. 1, 1994

[51] Int. Cl.$^6$ .................. G06K 9/46; H04N 1/40
[52] U.S. Cl. .............. 382/239; 382/232; 382/236; 382/233; 348/415; 341/107
[58] Field of Search .................. 382/236, 232, 382/233, 235, 239, 248, 251, 253; 341/107, 51, 73, 76; 348/416, 415; 358/426

[56] References Cited

U.S. PATENT DOCUMENTS

| | | | |
|---|---|---|---|
| 4,717,956 | 1/1988 | Moorhead et al. | 348/416 |
| 5,298,992 | 3/1994 | Pietras et al. | 348/415 |
| 5,313,204 | 5/1994 | Semasa et al. | 341/107 |
| 5,414,423 | 5/1995 | Pennebaker | 341/107 |
| 5,422,724 | 6/1995 | Kang | 382/232 |
| 5,442,458 | 8/1995 | Rabbani et al. | 358/426 |
| 5,471,207 | 11/1995 | Zandi et al. | 382/232 |
| 5,550,540 | 8/1996 | Furlan et al. | 341/51 |

*Primary Examiner*—Leo Boudreau
*Assistant Examiner*—Wenpeng Chen
*Attorney, Agent, or Firm*—Philip H. Albert; Townsend and Townsend and Crew LLP

[57] ABSTRACT

A data compression system uses sameness information, such as temporal sameness of corresponding pixels, in the coding process. Two sets of contexts are used, one set when a pixel is the same as a sameness pixel, and one set of contexts for residual coding of the pixel when it is not the same. The use of the sameness bit saves computation because, if in decoding the one "sameness" bit, a decompressor determines that the pixel is equal to the corresponding pixel in a previous frame, then no further decoding is needed for that pixel.

23 Claims, 7 Drawing Sheets

DATA COMPRESSION FOR PALETTIZED VIDEO IMAGES

BACKGROUND OF THE INVENTION

The present invention relates to the field of image compression, more specifically to the problem of compressing a sequence of digital images.

Compression of digital images is the process of rearranging the bits of an uncompressed image to form a compressed image using fewer bits. With lossless compression, the compressed image contains enough information to allow perfect reconstruction of the original uncompressed image. Some compression processes are lossy, where the uncompressed image can only be approximately reconstructed. In applications where lossy compression is used, the character of the digital images and the compression scheme are such that the reconstructed image looks enough like the original image so that the losses are not a problem. For example, in some lossy compression schemes, a small amount of the color variation or sharpness of an image is lost.

Despite the inability to perfectly reconstruct an image, lossy compression is still desirable because it often results in greater compression ratios than lossless compression. However, in some applications, losses are not tolerable and the compression must be lossless. In these applications, efficient lossless compression is needed. Efficiency, as used herein, refers to the compression ratio obtainable. Thus, a compressor which compresses a given input image to one quarter its size (compression ratio of 4:1) is more efficient than a compressor which compresses the given input image to one half its size (compression ratio of 2:1). The speed at which compression occurs given limited computing power is a different measure of compressor efficiency, but one which is not discussed here.

A digital image is described by a collection (usually a two-dimensional array) of pixel values assigned to pixels (for brevity, the terms "pixel" and "pixel value" are often used interchangeably). The pixel values indicate which color the pixel should be colored to form the image. If the image is a "palettized" image, the pixel values do not directly indicate the color values, but are indices into a color table which stores a cross reference matching each index value to a color value. One advantage of a palettized image over a nonpalettized image is that the group of like colored pixels can be changed just by changing one value in the color table. This aspect of palettized images is especially useful in video games. For example, a video game could store one palettized image of a race car and display a different colored race car for each player by assigning a different color table to each player. With nonpalettized images, one image would be needed for each player.

A disadvantage of palettized images is that they usually need to be compressed losslessly. Lossy compression might result in slight errors in pixel values. With nonpalettized images, these slight errors usually translate to slight shifts in the color values, which does not greatly affect the image. However, with palettized images, the errors translate to slight shifts in the index values, which may translate to major shifts in color which change the image a great deal.

One method of compression is taught by Zandi, et al., in a patent application entitled "Compression of Palettized Images and Binarization for Bitwise Coding of M-ary Alphabets Therefor", filed Feb. 23, 1994 as Application Ser. No. 08/200,233 and assigned to the assignee of the present invention. That application is incorporated by reference herein and is referred to as "Zandi". In Zandi, the existence of a color table is used to the advantage of a compression system. Since the pixel values of the image are arbitrary indexes into a table, the entries of the table can be rearranged without loss of information, so long as the color values in the table entries pointed to by the pixel values don't change. With this constraint, the pixel values are reassigned so that the bits of the pixel values are more compressible.

While the compression of Zandi is quite useful, even greater compression is needed where multiple images forming a moving display (i.e., a video sequence) need to be stored, since up to 60 images, or frames, need to be created for each second of the video sequence. At an image resolution of 256 pixels×240 pixels per image, and 8-bit pixel values, one uncompressed frame requires 61440 bytes (8 bits/byte) of storage, and a one second (60 frame) video sequence requires 3,686,400 bytes of storage unless it is uncompressed.

Good compression is important for video games which use video sequences and are supplied on video cartridges, because the game instructions, fixed images and video sequences are all stored in a Read Only Memory (ROM). Given that the video cartridges must be low-cost, video game designers are often constrained to a limited ROM size. Consequently, they desire better compression, which allows either more scenes to be included in a limited ROM, or allows for the use of a smaller, less expensive ROM for storage.

A compressor sequentially reads symbols from an input block to be compressed, compresses those symbols, and generates an output file. If the input file is a digital image or a sequence of frames (each frame being a digital image), the symbols are pixel values. When read sequentially, the pixel values are typically sequenced starting with the top row of pixels and moving to the bottom row of pixels, sequencing from left to right within each row. The original pixel being compressed is referred to as the "current" pixel, with "prior pixels" referring to those pixels already operated upon, "upcoming pixels" referring to pixels not yet operated upon, and a "next" pixel being the upcoming pixel operated upon immediately following the current pixel. Some compressors compress one bit of the current pixel at a time, in which case the bit being operated upon is said to be in the current bit plane.

A compressor includes a coder which converts the current symbol into a number of compressed bits (codeword). The codewords for all the symbols form the output block. In some coders the relation of the input symbols to the output codewords is fixed. In an adaptive entropy coder, the relation varies depending on the probability of occurrence of the current symbol. An entropy coder is so named because it attempts to compress data to the theoretical compression limit dictated by entropy. Entropy dictates that, on average, a symbol S cannot be coded into a number of bits less than the binary log of the inverse of the probability of the symbol S occurring. In other words, if the probability of symbol S occurring is P, then at least $N=\log_2(1/P)$ bits are needed to indicate symbol S in a compressed block for that symbol to be extractable from that compressed block. Thus, a compression ratio greater than the entropy limit is not possible for lossless compression.

In a Huffman coder, the number of bits per codeword is constrained to be a whole number, thus some codewords will be expressed by fractionally more bits than are required by entropy for the probability of that codeword. Because of this rounding, a Huffman coder does not compress as well as an entropy coder which can express codewords with fractional bits. The use of codewords with fractional numbers of bits is made possible by allowing codewords to overlap each other.

Even with fractional bits per codeword, an image is typically not compressible to its entropy limit since the probabilities are not determined exactly. Of course, the probability of each pixel value's occurrence in the input image can be determined exactly by studying the entire image, but information which is not available to the decompressor at the time the current pixel is to be decompressed should not be used to decide how to code the current pixel. Otherwise, the decompressor will not have enough information to decode the current pixel.

Fortunately, probability estimates based only on prior pixels provide suitable inputs to an entropy coder. To improve the probability estimates, contexts are used which allow for conditional probability estimates, i.e., given a context, the probability of pixel P being the current pixel. So that a decompressor can determine the context before decoding the current pixel, the context should only depend on prior pixels. The choice of elements which determine the context of a pixel is known as the context model. For example, in one context model, the context for a pixel being compressed is determined by the immediately previous prior pixel. To the extent that the probabilities are better estimated using a particular context model, that context model will result in better compression.

A context model works best when the context is a good predictor of the symbol or pixel being coded. For example, if the context of pixel P is C and the probability of P having the pixel value it has with that context is 0.50, then only one bit is needed to code for that pixel. However, if the probability is 0.70, then only one half bit is needed. Because the more predictable the pixel, the fewer bits, or bit fractions, are needed to code for the pixel, better context models result in better compression. In an image with large areas of solid color, the color of adjacent pixels is a good predictor of the color of the current pixel, and therefore a good context model is one where the context is determined by the color of adjacent pixels.

However, even with a good context model, greater compression is possible and desirable.

SUMMARY OF THE INVENTION

The present invention provides improved compression for video sequences by using two sets of contexts, one set to provide context to determine if a current pixel value is the same as a pixel in a corresponding position in a previous frame, and one set to provide context when coding a pixel value which is not the same as the pixel in the previous frame. The present invention provides improved context models by recognizing that temporally close pixels in a video sequence provide valuable context information for a pixel being coded, and where temporally close or spatially close pixels are the same, that information can be expressed using only one decision (a binary decision, but one which may encode to less or more than one bit). Thus, a context modeller which outputs a "sameness" decision need not process or provide an output when the sameness is true.

The use of the sameness decision saves computation because, if in decoding the one sameness decision, a decompressor determines that the pixel is equal to the corresponding pixel in a previous frame, then no further decoding is needed for that pixel.

The pixel pairs used for the sameness test need not be corresponding pixels from two frames, as the sameness bits in some applications could be referring to the sameness of the current pixel value and a pixel value of a pixel in a previous row or a displaced pixel in a previous frame. In fact, the current pixel can be compared to any previously transmitted pixel. For example, a camera might provide motion sensor outputs which indicate how a scene is changing from frame to frame so that the current pixel can be compared with a pixel which would have been in the same position in the previous frame, but for the camera motion (such a camera is shown in U.S. Pat. No. 5,430,480 issued Jul. 4, 1995, issued to Allen, et al. and assigned to the assignee of the present invention, entitled "Sensor Driven Global Motion Compensation"). Additionally, a table lookup, a motion estimation system, or other methods, could be used to deterministically select a previous pixel which is to be compared with the current pixel.

A further understanding of the nature and advantages of the inventions herein may be realized by reference to the remaining portions of the specification and the attached drawings.

DESCRIPTION OF THE PREFERRED EMBODIMENTS

Figure 1:
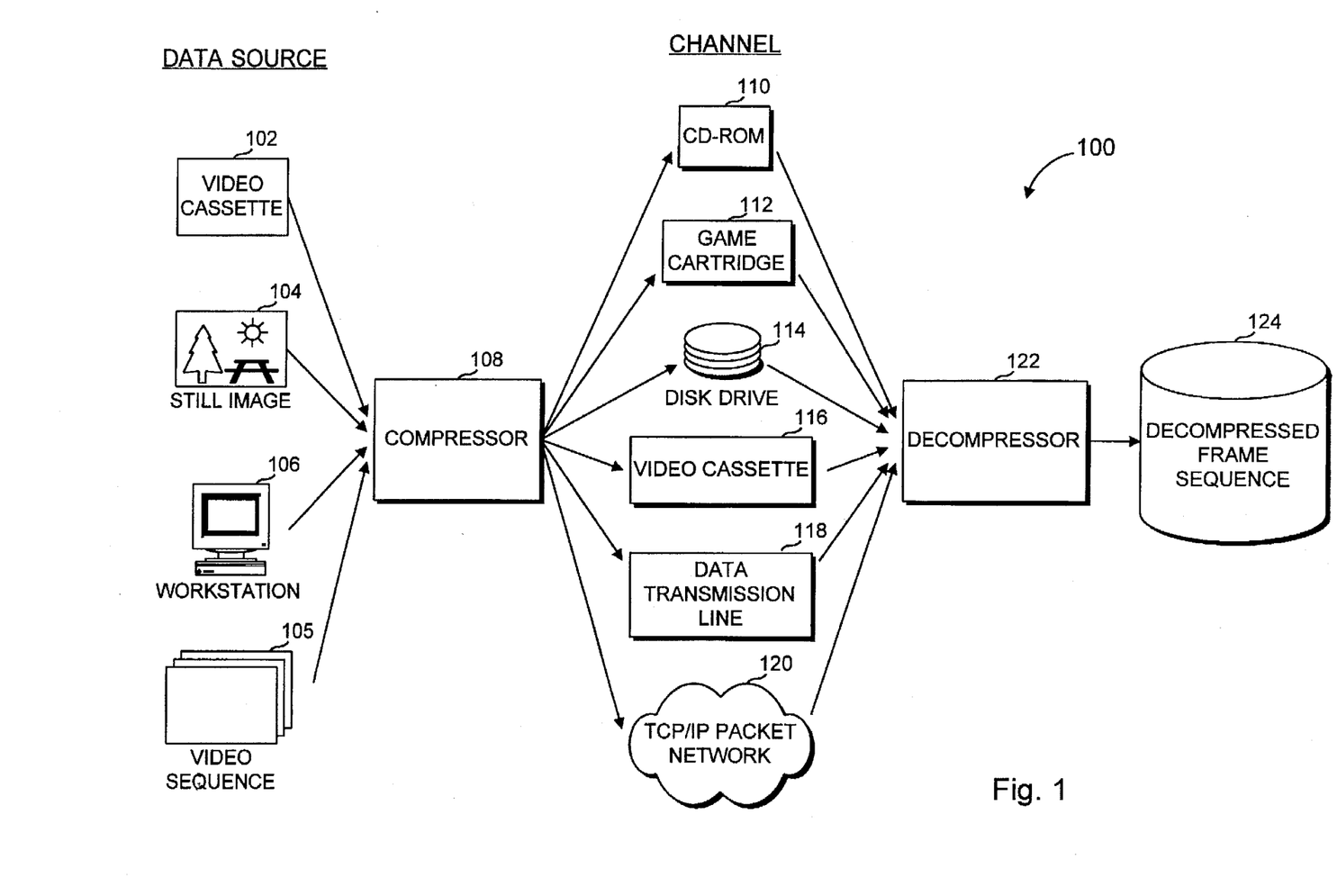
FIG. 1 is a block diagram of several applications using compression and decompression to efficiently store or transmit data.

FIG. 1 is a block diagram of a generalized application where compression is used. In this system, dam sources generate data and the eventual users of the data are separated from the data source, in time or space, by a limited channel. If the user and the source are not separated, or the channel is not limited, then compression is not really needed.

FIG. 1 shows several data sources, such as a video cassette 102, a still image 104, a video sequence 105 and a workstation 106 which produces rendered images. Where the data source is image data, and especially sequences of image frames, compression is needed because of the large amount of memory needed for uncompressed images or sequences. The present invention is described with reference to frame sequences, however the present invention is useful with other types of data sharing similar characteristics of frame sequence data.

The data is input to a compressor 108 which, if designed correctly, outputs a compressed image or images containing fewer bits than the original data. If compressor 108 is a lossless compressor, the original data is exactly recoverable from the bits of the compressed data. Once the data is compressed, it is applied to a channel, several examples of which are shown in FIG. 1.

One channel is a compact disk ROM (CD-ROM) 100, which is used as means for distributing software and large image files. Even though one CD-ROM might have a capacity of 600 MB (megabytes), some complex computer games require more than that to store images. Thus to fit more data onto a single CD-ROM and relieve a user of the inconvenience of having to constantly swap between multiple disks, the data is compressed to fit onto a single CD-ROM.

Another channel is a game cartridge 112 for use with a video game machine which accepts game cartridges. The constraint with video game cartridges is one of cost: as more physical memory is used, the cost of manufacturing each cartridge goes up. Similar constraints requiring compression apply to other storage media such as disk drive 114 and video tape cassette 116.

For some channels, the limitation is not a limit of storage, but a limit of transmission time and bandwidth, such as occur with a data transmission line 118 (telephone line, dedicated line, cellular telephone transmission, network cable, CD-ROM, etc.) or a packet network 120. Compression is desirable in these applications when the number of bits transferrable in a unit of time is limited and data is needed at a high rate, or where the usage cost of the transmission media is based on the number of bits transferred.

However the data is generated at a data source and transferred to an eventual user separated by the data source in time or space, the data needs to be decompressed by that eventual user, using only that which is transferred over the channel and what is known in advance. For this purpose, a decompressor 122 reconstructs what the data source initially provided to compressor 108.

Because of the separation between the source and the user, only information contained in the transmission can be used to decompress the information. Of course, the data source could provide hints to decompressor 112, but those hints would take up bandwidth in the transmission and should be counted as part of the size of the compressed file anyway. The data source could provide the hints through a different channel, but in a fair assessment of a compression system, this data should be considered part of the compressed data as well. Of course, one way to truly save memory and bandwidth is to have a priori data permanently (or semi-permanently, depending on the application) stored at the data source and at the eventual user system. However, this constrains the types of data which can be transmitted. In most applications, this constraint is not a problem. For example, video game cartridge makers and designers of video games systems usually agree on how their data is formatted and how it is compressed. If not, a portion of the bandwidth might need to be used to communicate setup information, such as image sizes. In one embodiment, images are fixed at 256 pixels wide, 240 pixels high, and 8 bits/pixel. By fixing this information, bandwidth need not be used delimiting the extent of each image. Information fixed ahead of time between the data source and the user system is referred to as "a priori information."

Figure 2:
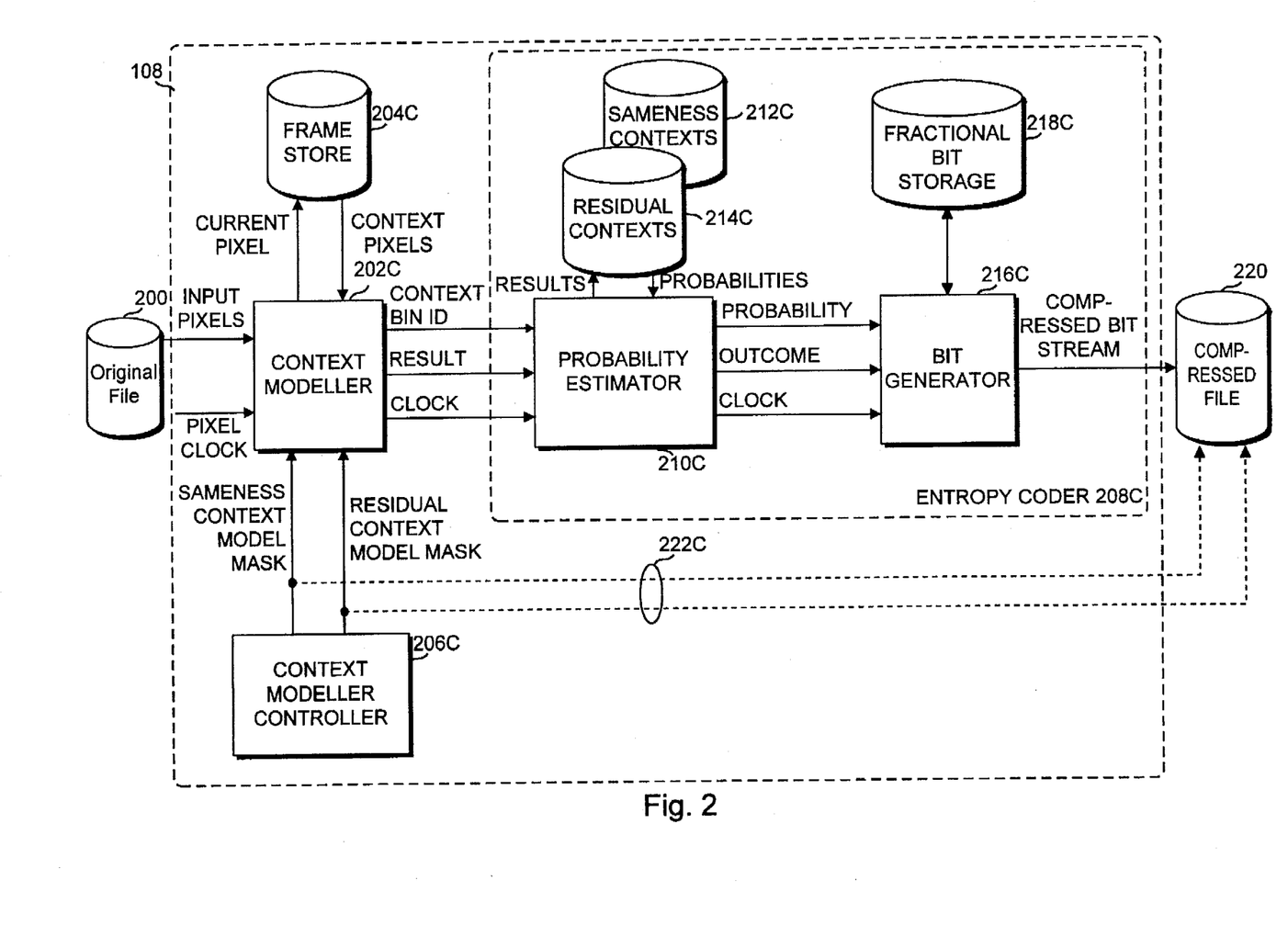
FIG. 2 is a more detailed view of the compressor shown in FIG. 1.

FIG. 2 shows compressor 108 in greater detail, along with an original file 200 representing a sequence of uncompressed images (frames) and a compressed file 220 representing a compressed version of original file 200. Although the compression performed by this system is described with respect to images and sequences of images, other data with similar characteristics is also compressible using this system.

Compressor 108 moves the original data through a context modeller 202C, and an entropy coder 208C to form compressed file 220. Context modeller 202C has an input for accepting original pixels and a pixel clock. In some embodiments, the original data (pixels) are self-clocking and the pixel clock is not needed. Context modeller 202C outputs a result value and a context bin identifier (ID) identifying a context for the result value, each cycle of a result clock. The result value is a binary value for binary entropy coders, and is an M-and value for M-ary coders. Of course, as taught by Zandi, an M-ary coder can be implemented using a binary coder and additional logic or processing.

The result clock is output as well if the data is not self-clocking. Where the input is a data storage device and the elements of compressor 108 are implemented by software modules, the elements are generally self-clocked by the operation of the software.

Context modeller 202C is also coupled to a frame store 204C, to update frame store 204C with the current pixel and to read context pixels or context bits from frame store 204C.

Several elements which form entropy coder 208C will now be described. A probability estimator 210C is coupled to accept the result and the context bin ID from context modeller 202C and outputs a probability value and an outcome value (which is a binary value for a binary bit generator). If necessary, probability estimator 210C also outputs an outcome clock. Probability estimator 210C is coupled to a sameness context table 212C and a residual context table 214C, to update probabilities in those tables and to read probabilities from those tables. Other, non-binary bit generators (multi-bit generators), such as Huffman or Tunstal bit generators, are also possible in some implementations.

A bit generator 216C inputs the probability value and the outcome value from probability estimator 210C, and outputs bits corresponding to the output codeword, saving fractional bits in a fractional bit storage 218C. The bit stream output by bit generator 216C forms compressed file 220.

Compressor 108 also includes a context model controller 206C which has two outputs coupled to context modeller 202C. One output provides a sameness context model mask, and the other provides a residual context model mask. If these two masks are not a priori information, the masks are included into compressed file 220, along paths 222C.

In operation, during each cycle of the pixel clock, compressor 108 accepts an input pixel (the "current" pixel) from file 200, which contains the original pixels. In response to the current pixel, compressor 108 outputs a number of bits to compressed file 220, where the number depends on the state of compressor 108, and can be zero bits (i.e. no bits output in a given input pixel cycle). In the zero bit output case, the internal state of 108 is changed. This will be reflected in a later compressed bit or bits.

Each pixel cycle might be divided into several result, or entropy, cycles. For example, when a pixel is an 8-bit quantity and the entropy coder is a binary entropy coder, each pixel cycle has eight result cycles, with a context bin value and result bit for each entropy cycle.

Context modeller 202C accepts the input pixel and outputs one or more sets each of a context bin ID and a result value. In one embodiment, the pixel is represented by a number of bits and in one entropy cycle one bit for the result value and one context bin ID are processed. In another embodiment, the result value is an 8-bit value, a single context ID is used, and the entropy coder is a multi-symbol arithmetic coder, such as is described by in Witten, H., R. Neal and J. G. Cleary, "Arithmetic coding for data compression," *Comm. of the ACM*, June 1987, Vol. 30, pp. 520–540.

Context modeller 202C determines the context bin ID and result, according to methods explained in more detail below. A context indicates something about the environment of the current pixel which can be determined by the decoder, such as the pixel value found to the left of the current pixel, or a combination of subcontexts such as the pixel value to the left combined with the bit plane of the result bit (e.g., the position of the result bit within the current pixel). In the case where only a few previous pixels are used, this is called a Markov model of the data.

A context model controls which attributes of the current pixel and its surroundings are used to determine the context. Because pixels are input to compressor 108 in a known order, context modeller 202C knows which frame the current pixel is from and the position of the current pixel within that frame.

Initially frame store 204C is empty, so it might not be able to provide contexts for very early pixels. However, the frame store could just be filled with an a priori value so that contexts can be provided for every result. After the first frame, frame store 204C contains at least a full frame. As frame store 204C fills, the oldest pixels are overwritten as new pixels are stored. Frame store 204C need only be large enough to hold the values needed to determine future contexts. For example, if no context referred to pixel values from earlier than the immediately prior frame, storage is only needed for one full frame. In some embodiments, the frame store already exists, so no additional memory is required.

The context bin ID output by context modeller 202C indicates the context of the current pixel as well as a mode selected from a sameness mode and a residual mode. Of course, by proper assignment of nonoverlapping context bin ID's only a context bin ID need be output. Except for the separation of conditional probabilities into two context tables, the operation of probability estimator 210C is similar to that of a conventional probability estimator. Of course, if sameness context bin ID's are distinguishable from residual context bin ID's, probability estimator 210C can be implemented using only one table, with a number of entries equal to the sum of the number of sameness contexts and residual contexts.

Once the context and the result are output to probability estimator 210C, a probability estimate (outcome) is transferred to bit generator 216C. In a binary entropy coder, the outcome indicates whether or not the result was the most probable symbol. Because of this, the probability estimate is always 0.5 or greater. In a multi-symbol arithmetic coder, the outcome might be an estimate of the probability of all the symbols in a list coming before the result.

After the probability estimate and outcome are sent to bit generator 216C, the result is used by probability estimator 210C to update the probability estimate. Following this update, the probability estimate is ready for the next occurrence of this context bin ID, but it is only based on information available at decode time (i.e., it is casual).

Bit generator 216C uses the outcome provided by probability estimator 210C and the probability estimate of that result to alter the internal state or states of bit generator 216C and output compressed bits if appropriate. In some embodiments, bit generator 216C is a bit generator such as the B-coder shown in U.S. Pat. No. 5,272,478 issued to Allen, et al. and assigned to the assignee of the present invention. In some embodiments, entropy coder 208C is an entropy coder such as the Q-coder developed by IBM of New York, or the ABS coder of Allen et. al. of Ricoh U.S. Pat. No. 5,381,145, issued Jan. 10, 1995.

Figure 3:
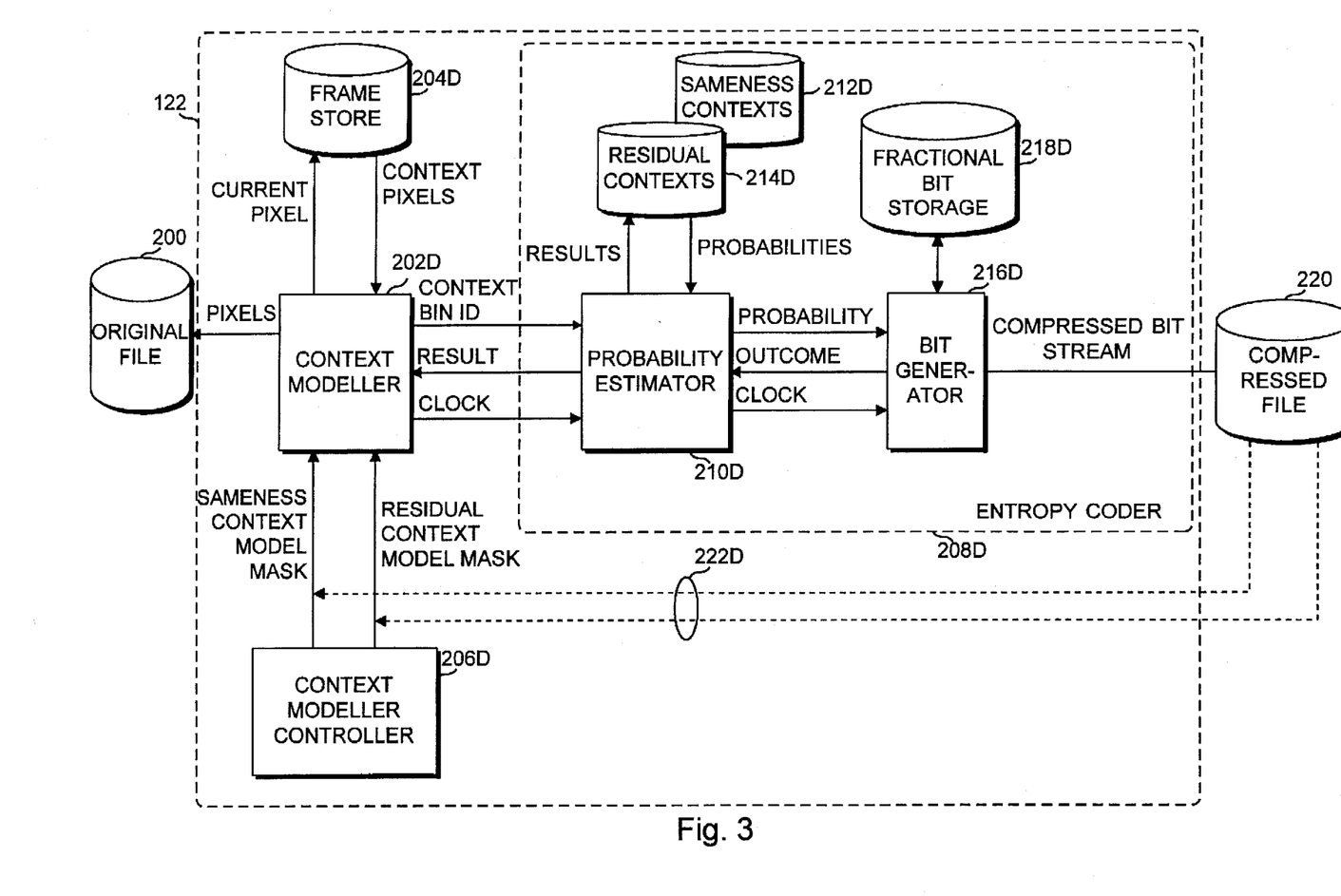
FIG. 3 is a more detailed view of the decompressor shown in FIG. 1.

FIG. 3 shows decompressor 122 in more detail, having many of the same elements as compressor 108. To distinguish similar elements of decompressor 122 and compressor 108, the elements of decompressor 122 are indicated by similar numbers but with a "D" suffix instead of a "C" suffix, such as context modeller 202D, frame store 204D, context model controller 206D and entropy decoder 208D comprising probability estimator 210D, context tables 212D, 214D, bit generator 216D and fractional bit storage 218D. Several differences between decompressor 122 and compressor 108 are worth noting.

In decompressor 122, the context bin ID is determined using pixels from the frame store, and context modeller 202D provides the so determined context bin ID to probability estimator 210D. Probability estimator 210D determines a probability for the most probable symbol, in the case of a binary entropy coder, and a probability distribution in the case of a multi-symbol arithmetic coder. Bit generator 216D then uses this probability information, along with fractional bit storage 218D and the compressed bit stream to determine the outcome. This outcome is coupled back to probability estimator 210D and is typically the same outcome which was passed from probability estimator 210C in the compression process. The bit generator then updates its fractional bit storage 218D.

The probability estimator uses the outcome to determine the result. This is typically the same result originally determined by context modeller 202C when encoding. The probability estimator passes this result to context modeller 202D and then updates context memory 212D or 214D matching the context bin ID. The context modeller uses the result to update the frame store, produce original pixels, and determine the next context bin ID. Context model controller 206D operates the same way as context model controller 206C.

With systems that both compress and decompress, some elements, such as the context model controller and the frame store, only occur once and serve both the compressor and the decompressor.

Figure 4:
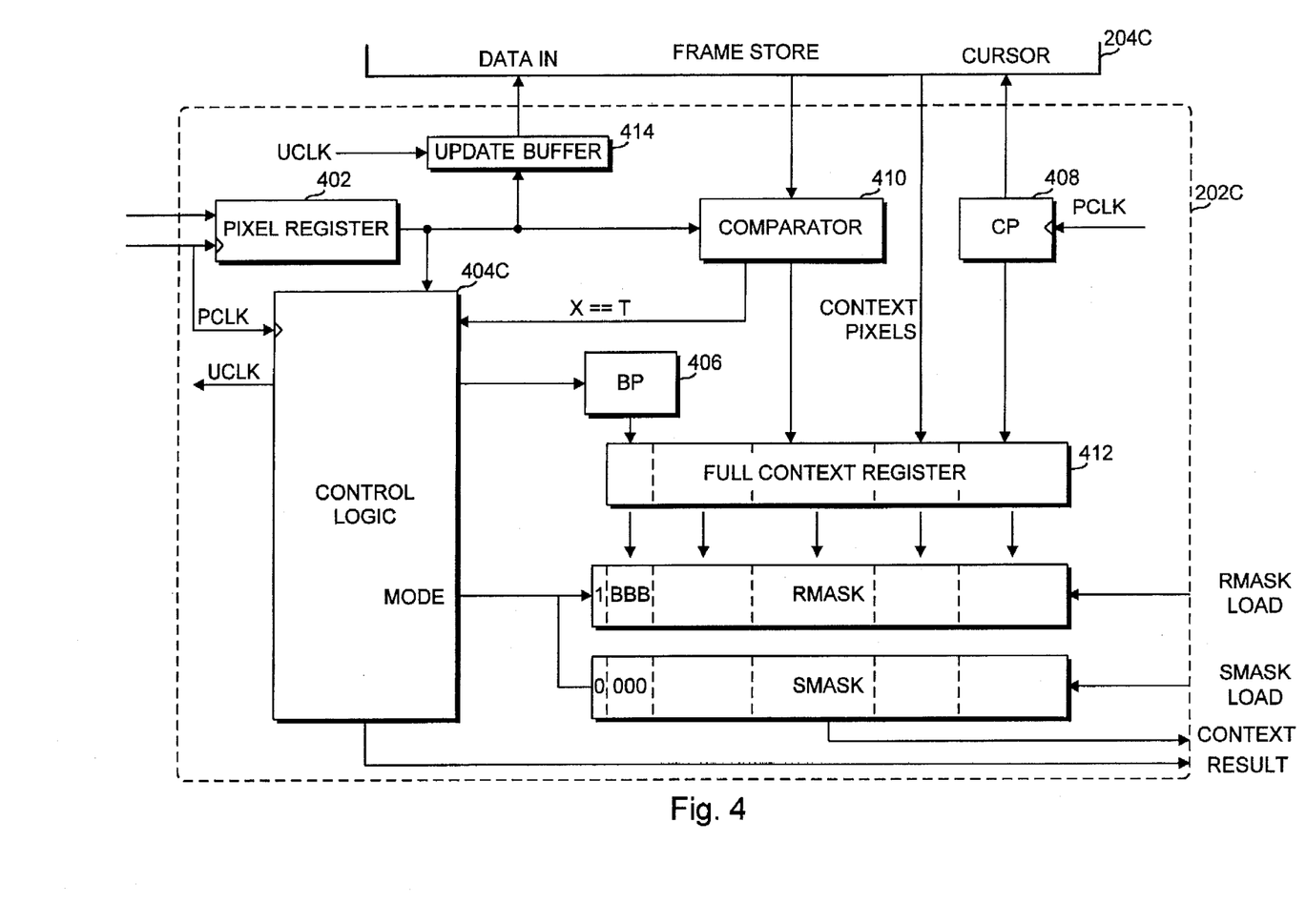
FIG. 4 is a more detailed view of the context modeller of the compressor shown in FIG. 2.

FIG. 4 is a more detailed block diagram of context modeller 202C. The details of context modeller 202D are similar, although they are not shown in the drawings. As shown in FIG. 4, context modeller 202C comprises a pixel register 402 for holding the current pixel, control logic 404C for implementing the precoding process shown in FIG. 6, a bit plane (BP) register 406 for indicating which bit of the current pixel is currently being processed if bit planes are processed separately, a cursor position (CP) register 408 for holding the position of the current pixel, a comparator 410 for generating sameness signals, a full context register 412, two context masks, RMASK and SMASK, and an update buffer 414.

The interconnections within context modeller 202C are as follows. Pixel register 402 has an input for the current pixel and a clock input to accept the pixel clock PCLK. Pixel register 402 outputs the current pixel to control logic 404C, comparator 410 and update buffer 414. Control logic 404C also has a clock input for PCLK, as well as inputs for the current pixel and a result of the test X=T (explained below). Control logic 404C has outputs for a bit plane indicator (provided to BP register 406), an update clock (UCLK) for clocking update buffer 414, a mode selector for selecting one mask of RMASK and SMASK, and an output for a result value. The RMASK mask is active in a residual mode, while the SMASK mask is active an a sameness mode. The active mask is used to mask full context register 412 to form a current context. The result output of control logic 404C is the result output of context modeller 202C.

The update clock clocks update buffer 414 to update frame store 204C after the context for the current pixel is obtained. Of course, if frame store 204C has enough space to hold the current pixel without overwriting any pixels which form the context for the current pixel, then PCLK can be substituted for UCLK.

BP register 406, comparator 410, frame store 204C, and CP register 408 each provide bits or pixels to full context register 412. The contents of register 412 are then masked by the mask indicated by the mode, and the masked context is output as the context bin ID output by context modeller 202C, as explained in more detail in FIG. 5 and accompanying text below. RMASK and SMASK include inputs to allow different masks to be loaded from context model controller 206C.

The operation of context modeller 202C during one pixel clock (PCLK) cycle will now be described. First, the current pixel is read into pixel register 402. CP register 408 "addresses" frame store 204C to obtain the context pixels for the current pixel. An exemplary context model is one where the pixel to the left of the current pixel forms the context. In this case, the pixel to the left would be read out of frame store 204C, with CP register 408 indicating where the current pixel is, and thus where the "pixel to the left" is to be found. Some of the context pixels are compared by comparator 410 to one another and to the current pixel. As shown in FIG. 4, the current pixel (designated "X") is compared to the pixel in the immediately previous frame which occupies the same pixel position as the current pixel does in the current frame (designated "T"). The result of this comparison is provided to control logic 404C. The results of other comparisons, such as the pixel to the left compared with the corresponding pixel from a previous frame, are provided to full context register 412.

Figure 5:
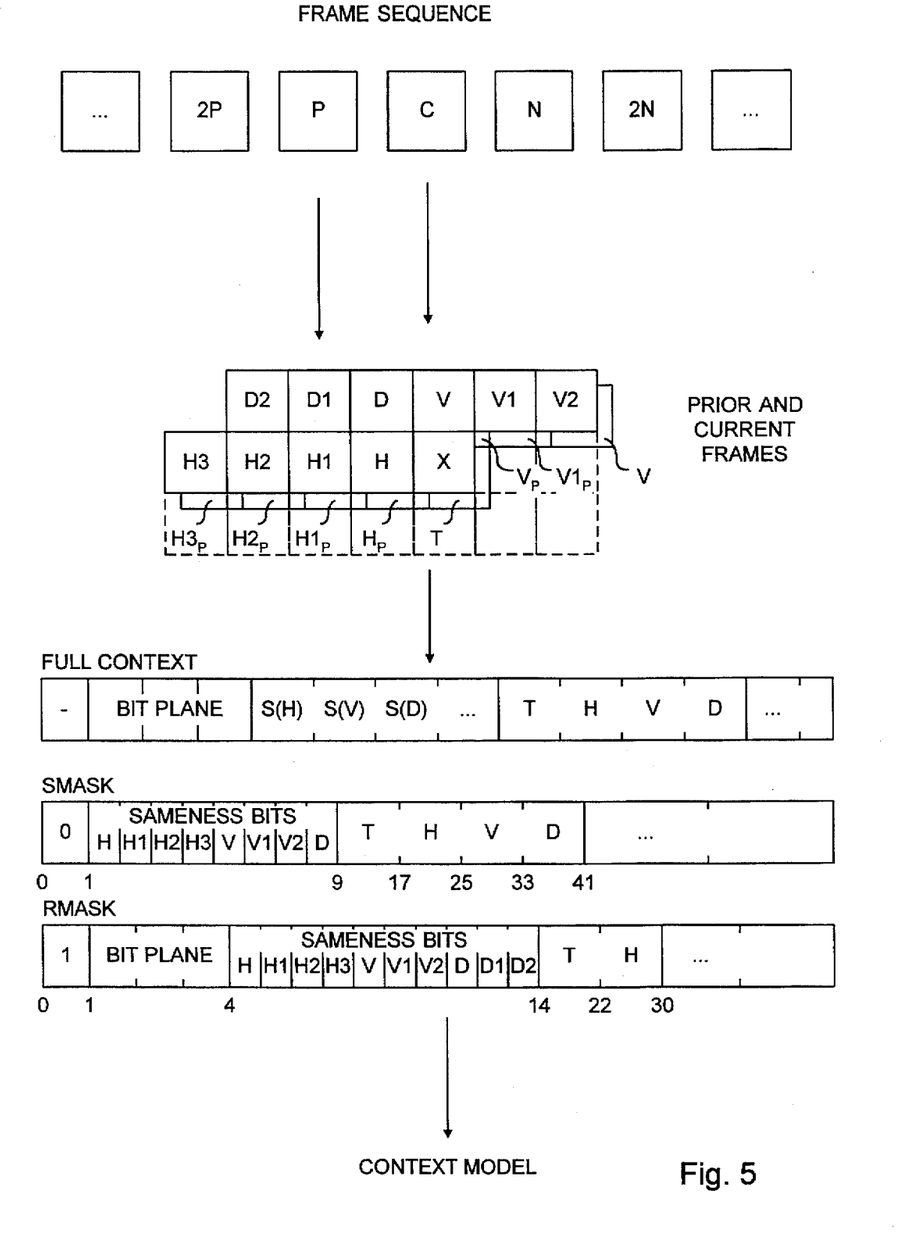
FIG. 5 is a schematic diagram of how contextual pixels are used to form sameness contexts and residual contexts.

FIG. 5 shows one possible arrangement of full context register 412 and the context masks (which are not shown in corresponding scale in FIG. 5 as they are in FIG. 4; nonetheless, the correspondence of bits in the register and the masks is apparent given this specification and the Figures). Context pixels are pixels relative to the current pixel, thus they are different for each pixel. In FIG. 5, the current pixel is labelled "X", the pixel to the left of X is labelled "H", the pixel just above X in the same vertical column is labelled "V", and the pixel diagonally to the upper left of X is labelled "D". Pixels which are nearby X, but further away than H, V or D, are labelled H1, H2, H3, V1, V2, D1, D2, etc. So that the current pixel is decodable, pixels to the right and below are not used for context since, as indicated above, the image is sequentially compressed from top to bottom and from left to right and decompressed in the same order.

The context pixels might be drawn from more than one frame. These multiple frames are shown as the current frame (C), the immediately previous frame (P), the immediately upcoming frame (N), the frame following N (2N), etc. Full context register 412 is shown with 46 bits for possible inclusion in the context model. In practice, not all 46 bits affect the context, because the resulting number of context bins ($2^{46}$) is too large to be practical. Table 1 shows several sameness context models for one example, along with the values for SMASK. Of course, depending on the implementation, more or less than 46 bits could be used and/or different context models could be used.

TABLE 1

Sameness Context Models

| Model | Sameness Context | # of Contexts | SMASK (in hex) |
|---|---|---|---|
| 0 | Single mode | 0 | 0 00 00-00-00-00 |
| 1 | No separate contexts | 1 | 0 00 00-00-00-00 |
| 2 | T | $2^8$ | 0 00 FF-00-00-00 |
| 3 | H | $2^8$ | 0 00 00-FF-00-00 |
| 4 | Same(H, V, D) | $2^3$ | 0 49 00-00-00-00 |
| 5 | Same(H, H1, V, V1, D) | $2^5$ | 0 CD 00-00-00-00 |
| 6 | Same(H, H1, H2, H3, V, V1, V2, D) | $2^8$ | 0 FF 00-00-00-00 |
| 7 | H, Same(H) | $2^9$ | 0 80 00-FF-00-00 |
| 8 | T, Same(H) | $2^9$ | 0 80 FF-00-00-00 |
| 9 | T, H | $2^{16}$ | 0 00 FF-FF-00-00 |
| 10 | T, H, Same(H) | $2^{17}$ | 0 80 FF-FF-00-00 |

In Table 1, for brevity, the function S(a) is used to indicate the result of a sameness test, a==$a_p$, where the subscript p is used to indicate a pixel or bit from a previous frame. T is used in place of $X_p$. Model 0 does not use sameness coding, but is included for comparison. Model 1 uses sameness coding, but does not use separate sameness contexts.

Figure 6:
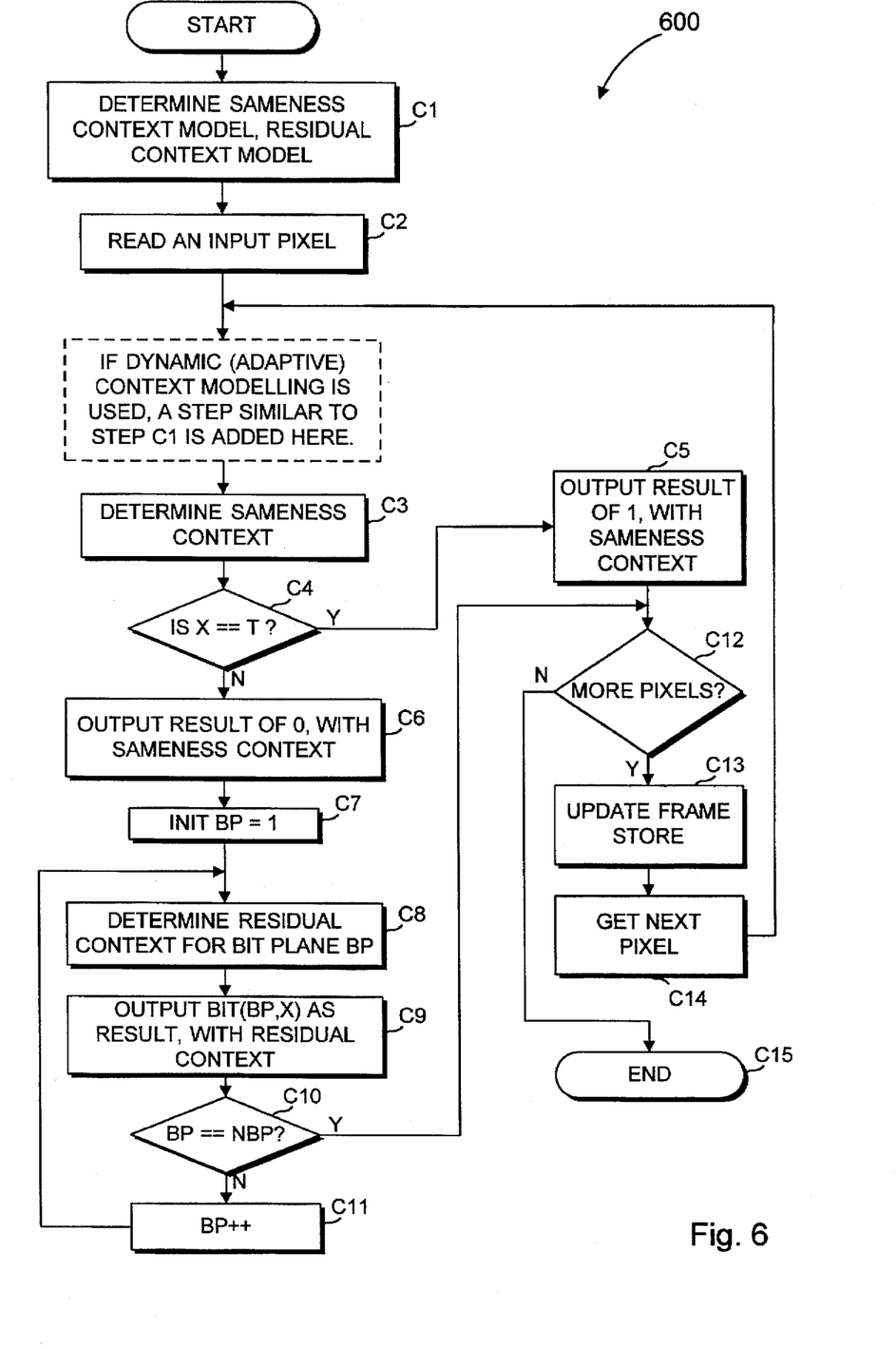
FIG. 6 is a flow chart of the precoding process performed by a context modeller.

FIG. 6 is a flow chart of the process followed by context-modeller 202C to convert the current pixel into a result and a context for that result. First, context model controller 206C determines the sameness context model and the residual context model and loads SMASK and RMASK (step C1). Once those are set, control logic 404C cycles the pixel clock to load the current pixel into pixel register 402 (step C2). In some embodiments, control logic 404C adaptively changes the masks in a causal manner.

Next, the sameness context is determined (step C3) by updating full context register 412 and masking with SMASK. If dynamic (adaptive) context modelling is used, the dynamic context model is determined first (step C3'). With the current pixel being X, the sameness test X==T is done (C4), and if that test result is true, a result value of 1 is output (C5) along with the sameness context of the current pixel. The sameness test tests whether or not the current pixel is the same as the corresponding pixel from a previous frame (i.e., whether the color of the current pixel changes from the previous frame). This test is represented by X==T and is performed by comparator 410, which reads T from frame store 204C and X from pixel register 402. If X==T is true, no other information about the current pixel needs to be output.

If X==T is not true, the negative test result (0) is output as the result with the sameness context of the current pixel (C6). Because only one sameness result is output per pixel, bit plane position is not part of the sameness context. If the sameness test indicates X and T are different, context modeller 202C must now output an indication of the value of X. This is referred to herein as residual coding. The sameness test is generalizable beyond just temporal sameness of a pixel and a pixel from a prior frame, but when the test is X==T, the sameness mode can be referred to as a temporal mode and the residual mode can be referred to as a nontemporal mode.

In the residual mode, the original pixel is output one bit at a time. To do this, control logic 404C initializes BP register 406 to point to the first bit plane (C7), determines the residual context for the current pixel and current bit plane (C8), and outputs b(BP, X) as the result (C9), where $b_0$ is a function which extracts the bit of X which is in bit plane BP. Because the residual contexts are preceded by "0" and sameness contexts are preceded by "1", the entropy coder accepting the context and result outputs can differentiate between results of a sameness test and residual results.

After the residual bit output, the bit plane is compared to the number of bit planes (N BP), to check if it is the last bit plane (C10). If more bit planes remain, the BP register is incremented (C11), and the process repeats at step C8. Otherwise, the process continues at step C12, where a test is done to check if any more pixels remain to be compressed. This step also follows step C5. If more pixels remain to be processed, control logic 404C cycles UCLK to update frame store 204C (C13) and then cycles PCLK to get the next pixel (C14). If no more pixels remain, the process terminates (C15).

While the above description and FIG. 6 describe residual result outputs suited for a binary coder, the adjustments to accommodate an M-ary coder are straightforward, such as eliminating the BP register and outputting only one residual result per pixel when X is not equal to T (none need be output when X and T are equal).

Examples of different residual context models are shown in Table 2. Bit plane coding uses three bits of context to indicate the current bit plane, whereas simulated M-ary coding uses 255 contexts based on bits from prior bit planes (as described by Zandi). For simplicity, the number of contexts required for M-ary coding is rounded to 256 in Table 2.

TABLE 2

Residual Context Models

| Model | Residual Context | # of Contexts |
|---|---|---|
| 0 | M-ary | 2^8 |
| 1 | BP, b(BP,H,H1,H2,H3,V,V1,V2,D,D1,D2) | 2^13 |
| 2 | M-ary, H | 2^16 |
| 3 | M-ary,T | 2^16 |
| 4 | BP, b(BP,H,H1,H2,V,V1,V2,D,D1) | 2^11 |

In Table 2, BP refers to the current bit plane value, and the function $b_0$ refers to the values of the bits from the bit plane BP for the parameter pixels. The values for RMASK for each residual context model can be easily determined in the same manner as the SMASK values in Table 1.

Figure 7:
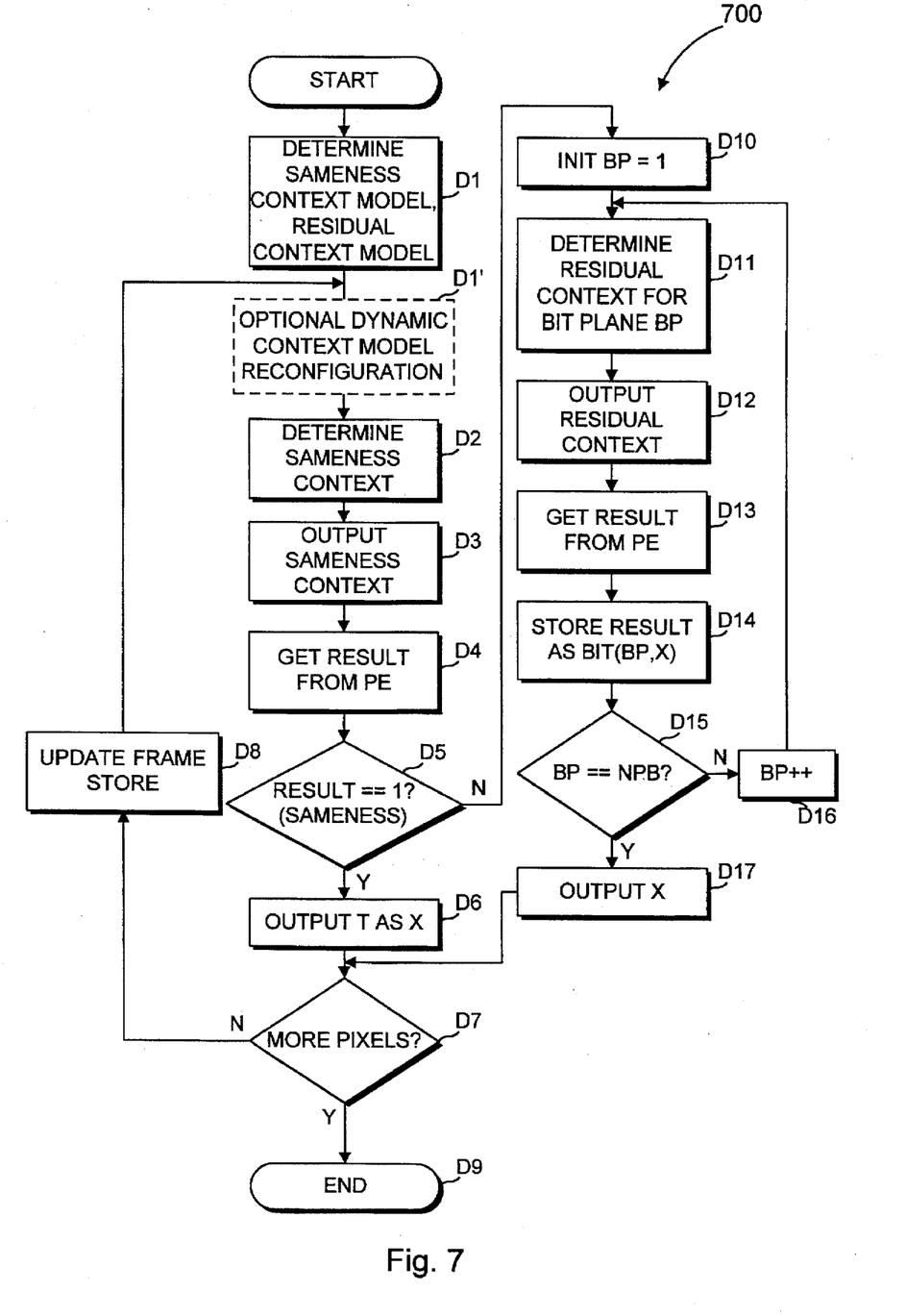
FIG. 7 is a flow chart of the decoding process performed by a context modeller.

FIG. 7 is a flow chart of the decompression process which is described with reference to FIG. 3 as well as FIG. 7. This process is performed by decompressor 122, including context modeller 202D. Context modeller 202D is similar to context modeller 202C, except that context modeller 202D inputs a result and outputs an input, thus requiting different control logic.

The decompression process begins when a sameness context model and a residual context model are determined (step D1). As should be apparent, if the sameness context model and the residual context model are fixed throughout an application, the context model controllers are not needed. If several context models are used, they can either be deterministically based on prior data or they can be inserted into compressed file 220 along with the compressed data. The context model information is provided to compressed file 220 along path 222C (shown in FIG. 2) during the compression process, and is extracted along path 222D in the decompression process.

Context modeller 202D then determines the current sameness context (step D2), and outputs this to probability estimator 210D (step D3). If dynamic context model reconfiguration was used to compress, the context model is reconfigured during decompression before step D2 (step D1'). With the context information, probability estimator 210D can output a probability for that context to bit generator 216D, which uses that information to determine how many bits to read from the compressed image, and uses that information to determine a consistent outcome from the bits read and the probability. Bit generator 216D outputs the outcome value to probability estimator 210D, which converts the outcome to a result, updates its probability table for the current context and outputs the result to context modeller 202D (step D4). Because of the ordering of the compressed image, the first context is known to be a sameness context.

Context modeller 202D checks the result (D5). If it is 1, indicating that the current pixel X was the same as T, context modeller 202D reads T from frame store 204D and outputs T as the current pixel (D6). Context modeller 202D then checks for more pixels (D7). If there are more pixels, frame store 204D is updated with pixel X (D8), otherwise the process ends (D9).

If the sameness result at step D5 is 0, indicating that the current pixel is different than T, context modeller 202D then goes into a residual mode, where it is expecting residual results to follow the negative sameness result. In the residual mode, the first bit plane is processed by setting the current bit plane (BP) equal to the first bit plane (D10), determining the residual context for the current bit plane (D11), outputting that context to probability estimator 210D (D12), obtaining a result from probability estimator 210D (D13), and outputting that result as b(BP, X), i.e. the BP-th bit of X. The bits can be output separately or buffered until the entire pixel value is available.

After the result for one bit plane is obtained, if the control logic determines there are more bit planes (D15), then BP is incremented (D16) and the process continues back to step D11. Otherwise, the current pixel is output (D17), and the control logic goes to step D7 to check for more pixels.

The figures have now been described. In summary, using the system shown therein, data is compressed before being passed through a limited channel, and is decompressed by the eventual user. The example above referred to compressing data which is a sequence of frames, each frame being a digitized image. The compressor uses an entropy coder to compress the frames, and a context modeller provides contexts for the current pixel or the current bit of the current pixel depending on a mode. If the current pixel is the same as the pixel used for a sameness context, the sameness result is indicated in a sameness mode to the entropy coder and no other information about the current pixel need be provided, except a sameness context for that result if more than one sameness context is used.

In the above example, the pixel used for the sameness test is a pixel from a prior frame in the same position as the current pixel, thus the sameness is a temporal sameness. If the sameness test is negative, i.e., the pixels are different, the compressor switches to a residual mode, where the current pixel is provided to the entropy coder along with one ore more residual contexts and residual results.

The decompressor decompresses the frames by determining the context for the current pixel and then decoding the current pixel from the bit stream. A context model controller is provided to allow for varying context models. If the context model is varied, then the particular context model used can be included as part of the compressed data.

Several tests were done to determine the relative performance of using sameness information in the compression process. For this test, three palettized frame sequences were used. The first sequence is an sequence showing text moving over a solid background and uses only three different colors. The second sequence shows a ray-traced sphere moving in front of a stationary checker board pattern, and uses a large number of different colors. The third is a digitized clip of an animated movie, which uses 252 different colors and has several scene changes within the clip. The digitized clip includes noise introduced in the acquisition process. Table 3 shows the compressibility of these three sequences, using sameness coding and not using sameness coding. The sameness test used is the temporal test.

TABLE 3

Compression Results

| Bit Rate/Compression | Text Image | Ray-Traced | Movie |
| --- | --- | --- | --- |
| Non-sameness | | | |
| Bits/Pixel: | 0.111 | 0.596 | 1.818 |
| Compression Ratio: | 72:1 | 13.4:1 | 4.40:1 |
| Sameness | | | |
| Bits/Pixel: | 0.030 | 0.130 | 1.835 |
| Compression Ratio: | 267:1 | 61.5:1 | 4.36:1 |

As Table 3 shows, sameness coding can improve the compression of many sequences. While the movie sequence was not very compressible in either case, a typical high-quality sequence either generated or digitized with little noise, is expected to yield results between that of the ray-traced sequence and the acquired movie sequence.

Further tests were done on these three sequences to determine the best sameness context models and residual models to use. The results for Table 3 were obtained using the sameness context model and the residual context model which provided the best performance (sameness context models are meaningless for the non-sameness coding). For the text sequence, contexts based on the previous frame pixel T and M-ary coding of the current pixel (residual model 3 from Table 2) worked best in both the sameness and non-sameness coding. In the sameness coding, sameness model 6 (see Table 1) worked best of all the sameness models, regardless of the residual coding used, and the combination of these two worked best overall.

For both the ray-traced sequence and the movie sequence, sameness context 10 tended to work the best for sameness coding, however, in each case, the less complex sameness model, model 6, with only $2^8$ contexts performed nearly as well as the more complex sameness model, model 10, with $2^{17}$ contexts.

The results of the tests are shown in tables 4–6, which tabulate the bit rates for compression of the three sequences (bit rate of 8.0 for uncompressed images) using each of the sameness context models and the residual context models. The best result for each sameness model is indicated by an asterisk ("*") and the best result for each of residual model is indicated by a cross ("†"). As indicated in Table 1, sameness model 0 is the nontemporal case. Although it has not been tested, the use of palette reordering as taught by Zandi should improve the compression for bit plane residual coding (models 1 and 4).

TABLE 4

Bit Rates for Text Sequence (units: bits/pixel)

| Sameness Model | Residual Coding Model | | | | |
| --- | --- | --- | --- | --- | --- |
| | 0 | 1 | 2 | 3 | 4 |
| 0 | 0.412161 | 0.193621 | 0.135616 | †0.111391 | 0.204014 |
| 1 | 0.177835 | 0.198109 | 0.164097 | †0.157565 | 0.200171 |
| 2 | 0.131613 | 0.151887 | 0.117875 | †0.111343 | 0.153948 |
| 3 | 0.166009 | 0.186283 | 0.152271 | †0.145739 | 0.188344 |
| 4 | 0.059420 | 0.079695 | 0.045681 | †0.039149 | 0.081757 |
| 5 | 0.057181 | 0.077455 | 0.043443 | †0.036911 | 0.079516 |
| 6 | *0.050442 | *0.070716 | *0.036704 | *†0.030172 | *0.072777 |
| 7 | 0.068909 | 0.089183 | 0.055171 | †0.048639 | 0.091244 |
| 8 | 0.068082 | 0.088356 | 0.054344 | †0.047812 | 0.090417 |
| 9 | 0.081577 | 0.101851 | 0.067839 | †0.061307 | 0.103912 |
| 10 | 0.059190 | 0.079463 | 0.045451 | †0.038921 | 0.081525 |

TABLE 5

Bit Rates for Ray-Traced Sequence (units: bits/pixel)

| Sameness Model | Residual Coding Model | | | | |
| --- | --- | --- | --- | --- | --- |
| | 0 | 1 | 2 | 3 | 4 |
| 0 | 6.198752 | 0.753652 | 0.595772 | †0.260222 | 0.786317 |
| 1 | 0.405009 | 0.294170 | †0.287095 | 0.292788 | 0.299495 |
| 2 | 0.372193 | 0.261355 | †0.254280 | 0.259972 | 0.266679 |
| 3 | 0.394434 | 0.283596 | †0.276520 | 0.282213 | 0.288920 |
| 4 | 0.278253 | 0.167359 | †0.160339 | 0.166032 | 0.172694 |
| 5 | 0.270049 | 0.159210 | †0.152135 | 0.157828 | 0.164535 |
| 6 | 0.257286 | 0.146448 | †0.139372 | 0.145065 | 0.151772 |
| 7 | 0.320315 | 0.209476 | †0.202401 | 0.208093 | 0.214800 |
| 8 | 0.316335 | 0.205497 | †0.198421 | 0.204114 | 0.210821 |
| 9 | 0.257949 | 0.147111 | †0.140035 | 0.145728 | 0.152435 |
| 10 | *0.247979 | *0.137141 | *†0.130065 | *0.135758 | *0.142465 |

TABLE 6

Bit Rates for Movie Sequence (units: bits/pixel)

| Sameness Model | Residual Coding Model | | | | |
| --- | --- | --- | --- | --- | --- |
| | 0 | 1 | 2 | 3 | 4 |
| 0 | 5.945661 | 2.988204 | *†1.817502 | 3.178031 | 3.011870 |
| 1 | 4.581269 | 3.136999 | †2.250583 | 3.278456 | 3.149422 |
| 2 | 4.480807 | 3.036537 | †2.150121 | 3.177994 | 3.048959 |
| 3 | 4.501576 | 3.057305 | †2.170890 | 3.198763 | 3.069728 |
| 4 | 4.336257 | 2.891990 | †2.005567 | 3.033439 | 2.904412 |
| 5 | 4.318405 | 2.874134 | †1.987719 | 3.015592 | 2.886557 |
| 6 | 4.299738 | 2.855468 | †1.969053 | 2.996925 | 2.867891 |
| 7 | 4.356513 | 2.912243 | †2.025827 | 3.053700 | 2.924666 |
| 8 | 4.335770 | 2.891500 | †2.005084 | 3.032957 | 2.903923 |
| 9 | 4.171252 | 2.726982 | †1.840567 | 2.868440 | 2.739405 |
| 10 | *4.166172 | *2.721901 | †1.835486 | *2.863359 | *2.734324 |

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of compressing an input symbol of a plurality of input symbols comprising the steps of:

comparing the input symbol to a sameness symbol, where the sameness symbol is a symbol relative to the input symbol according to a sameness relation, the step of comparing resulting in a sameness result;

determining a sameness context for the input symbol, where the sameness context is dependent on at least one context symbol, or portions thereof, relative to the input symbol according to a sameness context model;

outputting the sameness result and the sameness context to an entropy coder;

if the sameness result is negative, indicating a nonequivalence of the input symbol and the sameness symbol, performing the steps of:

determining a residual context for the input symbol, where the residual context is defined at least by context symbols, or portions thereof, relative to the input symbol according to a residual context model; and outputting a representation of the input symbol as a residual result and the residual context to a coder; and coding the sameness result, and the residual result if output, using the coder.

2. The method of claim 1, wherein the input symbol is a pixel in a sequence of frames, and wherein the sameness relation is such that the sameness symbol is a pixel in a location in a previous frame corresponding to a symbol location of the input symbol in a current frame.

3. The method of claim 1, wherein the input symbol is a pixel in a sequence of frames, and wherein the sameness relation is such that the sameness symbol is a previously transmitted symbol which at least approximately represents a point in a scene which point is also represented by the input symbol.

4. The method of claim 3, further comprising a step of performing motion estimation between frames to locate the previously transmitted symbol used as the sameness symbol.

5. The method of claim 1, where the sameness context model is such that the sameness context is further dependent on sameness test results for a sameness test performed on context symbols.

6. The method of claim 1, wherein the step of outputting a representation of the input symbol comprises a step of outputting a binary residual result and a bit plane residual context for each bit plane of the residual result.

7. The method of claim 1, wherein the coder is a binary coder.

8. The method of claim 1, wherein the coder is an M-ary coder.

9. The method of claim 1, further comprising a step of decompressing the input symbol from the output of the coder.

10. The method of claim 1, wherein the sameness context is dependent on sameness of a symbol index of the input symbol and a symbol index of the sameness symbol.

11. A context modeller, for use in a compression or decompression system, wherein pixels are input and result values and context values are output to an entropy coder, the context modeller comprising:

an input pixel register, coupled to receive a pixel in each of a plurality of clock cycles including a current clock cycle in which the input pixel register stores a current pixel value, the input pixel register clocked by a pixel clock;

a frame store, coupled to the input pixel register for storing previous contents of the input pixel register, including an output for context data;

a comparator coupled to the frame store and the input pixel register, which comparator compares a first portion of the context data to the current pixel value, and outputs at least one sameness indication including a primary sameness indication;

a context register, coupled to at least to the comparator, which stores at least the primary sameness indication and a second portion of the context data;

result output means, coupled to the input pixel register, for outputting a result value based on the current pixel value;

a sameness mask, coupled to the context register, which masks bits from contents of the context register to form a sameness context value;

a residual mask, coupled to the context register, which masks bits from contents of the context register to form a residual context value; and control logic means for outputting the sameness context value as the context value corresponding to the result value output by the result output means when the primary sameness indication indicates a sameness and for outputting the residual context value as the context value corresponding to the result value output by the result output means when the primary sameness indication indicates other than a sameness.

12. The context modeller of claim 11, wherein the control logic means includes clocking logic which outputs additional residual context values and corresponding results values.

13. The context modeller of claim 11, wherein the first portion of the context data, the second portion of the context data, the contents of the sameness mask and the contents of the residual mask are determined according to a context model.

14. The context modeller of claim 13, wherein the context model is predetermined.

15. The context modeller of claim 13, wherein the context model is dynamically adapted according to values of pixels input to the context modeller.

16. The context modeller of claim 11, wherein the first portion of the context data indicates a pixel value of a pixel obtained from a previous frame and from a position in the previous frame corresponding to a position of the current pixel.

17. The context modeller of claim 11, wherein the output of the comparator includes sameness indications for more than the current pixel value and a previous pixel value.

18. The context modeller of claim 11, wherein the result value is a binary value and additional result values are output if the primary sameness indication indicates other than sameness.

19. The context modeller of claim 11, wherein pixel values are indices into a color table.

20. The context modeller of claim 11, wherein the first portion of the context data and the second portion of the context data overlap.

21. The context modeller of claim 11, further comprising a cursor pointer register clocked by the pixel clock and coupled at an output to the frame store, whereby the cursor pointer provides an address to the frame store and the frame store responds by outputting the context data corresponding to an addressed context.

22. The context modeller of claim 21, wherein the full context register also stores a bit plane indicator and contents of the cursor pointer register.

23. The context modeller of claim 11, further comprising frame store update means.

* * * * *